United States Patent [19]
Kim

[11] Patent Number: 6,055,265
[45] Date of Patent: Apr. 25, 2000

[54] APPARATUS FOR RECEIVING GPS SIGNALS BY UTILIZING NON-COHERENT DLL

[75] Inventor: Hae Sik Kim, Kyoungki-do, Rep. of Korea

[73] Assignee: Hyundai Electronics Ind. Co., LTD., Kyoungki-Do, Rep. of Korea

[21] Appl. No.: 08/976,782

[22] Filed: Nov. 24, 1997

[30] Foreign Application Priority Data

Nov. 30, 1996 [KR] Rep. of Korea ........................ 96-60256

[51] Int. Cl.⁷ ........................................................ H04K 1/00
[52] U.S. Cl. .......................... 375/150; 375/142; 375/367
[58] Field of Search ...................... 375/200, 206, 375/208, 209, 210, 349, 354, 367, 371, 130, 140, 142, 150; 342/355, 357, 450, 463; 455/306, 307, 311

[56] References Cited

U.S. PATENT DOCUMENTS

| | | | |
|---|---|---|---|
| 4,807,256 | 2/1989 | Holmes et al. | 375/344 |
| 4,841,544 | 6/1989 | Nuytkens | 375/206 |
| 4,894,662 | 1/1990 | Counselman | 342/357.12 |
| 4,894,842 | 1/1990 | Broekhoven et al. | 375/206 |
| 5,093,839 | 3/1992 | Kohno et al. | 375/200 |
| 5,410,750 | 4/1995 | Cantwell et al. | 455/306 |
| 5,809,064 | 9/1998 | Fenton et al. | 375/208 |

*Primary Examiner*—Stephen Chin
*Assistant Examiner*—Chieh M. Fan
*Attorney, Agent, or Firm*—Lawrence G. Kurland, Esq.; Bryan Cave LLP

[57] ABSTRACT

GPS satellite signals are received, and a C/A code is synchronized by utilizing the non-coherent DLL so as to remove the unique code of the GPS satellite. There are generated ½-bit lagging, ½-bit leading and normal satellite codes. Then a correlation between the former and a down-converted intermediate frequency signals is carried out. Mixers mix the correlated three different phase signals with signals of a local oscillator. The output signals of the mixers are filtered by a band filter, and envelopes are detected from the filtered signals by an envelope detecting section. The detected envelopes are subtracted from each other. The output signals of the subtractor are filtered by a loop filter, and the filtered signals are controlled by a voltage control oscillator. The oscillated signals are inputted as clock signals into a satellite code generating section.

8 Claims, 6 Drawing Sheets

APPARATUS FOR RECEIVING GPS SIGNALS BY UTILIZING NON-COHERENT DLL

BACKGROUND OF THE INVENTION

1. Field of the Invention

The present invention relates to an apparatus for receiving GPS signals. Particularly, the present invention relates to an apparatus for receiving GPS signals, in which GPS signals are received by utilizing a non-coherent DLL method.

2. Description of the Prior Art

Generally, the GPS (global positioning system) is a system which consists of 24 satellites launched by the U.S. army, ground control stations and users' movable stations. The planar position of a movable station can be known by measuring the distances between the movable station and three or more of satellites.

If the position is to be measured by means of the GPS, the waves of four GPS satellites have to be simultaneously received, and the code pattern which is assigned to each of the satellites has to be decoded. The waves of a GPS satellite have a form of random secret codes, and therefore, when the waves are received, they are decoded by referring to a random code information. The waves which are transmitted by the GPS satellite correspond to a PRN code (pseudo random noise code), and they are signals which are spectrum-spread by a PSK (phase shift keying) modulation. The PRN code consists of two kinds, i.e., a C/A (coarse and access) code and a P (precision) code. The C/A code has been laid open, while the P code is handled secretly.

The signals which are transmitted by the GPS includes an L1 carrier wave of 1.5 GHz and an L2 carrier wave of 1.2 GHz. The signals which are received from the GPS satellite are down-converted two times, and among these signals, the C/A codes are inversely spread. In this way, the unique code of the relevant satellite is removed, thereby obtaining the desired information.

In the GPS satellite signals, the spectrum spreading method is used, and therefore, if the signals are not synchronized, communications are impossible. Therefore, in a non-synchronized state, the C/A code has to be synchronized within a short period of time. The active type synchronizing circuit which is capable of removing the C/A code within a short period of time includes typically three kinds.

A coherent delay lock loop demodulates basic signals after taking the correlation between the codes, in a state with the carrier waves removed from the received signals. U.S. Pat. No. 5,600,656 discloses an apparatus for receiving GPS signals by utilizing a coherent delay lock loop. In the conventional apparatus, the delay time of the C/A codes which is caused by the ionospheric layer is corrected by utilizing the delay time between the P codes of the L1 band and the L2 band.

A τ-dithering loop is a circuit having a single correlator, and thus, it is simple. In this circuit, the received signals are demodulated by time-dividing the leading signals and the lagging signals. The coherent delay lock loop is incapable of processing the intermediate frequency. In the τ-dithering loop, the circuit is simple, but the received signals are demodulated by time-dividing the leading signals and to lagging signals as described above, and therefore, it is weak against thermal noises. Further, a 6 dB correlation loss is generated compared with the DLL.

Therefore, there is a need for a GPS signal receiving apparatus in which a non-coherent delay lock loop is utilized so as to avoid the disadvantages of the τ-dithering loop and the coherent delay lock loop.

SUMMARY OF THE INVENTION

The present invention is intended to overcome the above described disadvantages of the conventional techniques.

Therefore it is an object of the present invention to provide a GPS signal receiving apparatus using a non-coherent DLL, in which the unique code of a GPS satellite is removed by synchronizing the C/A code by utilizing the non-coherent DLL.

In achieving the above object, the GPS signal receiving apparatus using a non-coherent DLL according to the present invention includes: a satellite code generating section for receiving clock signals of a certain frequency to generate lagging, leading or normal satellite code; a correlating section for taking the correlation between the lagging, leading or normal phase satellite code of the satellite code generating section and intermediate frequency signals which have been down-converted to a low frequency after received from a GPS satellite; a mixing section for mixing together the signals of different phases of the correlating section and signals of a local oscillator respectively; a band filter section for filtering output signals of the mixing section into preset bands respectively; an envelope detecting section for detecting envelopes from output signals of the band filter section; a subtracting section for correlating the lagging and leading phase satellite codes with the intermediate frequency signals to output a difference between the two sets of signals of the mixing section and the band filter section and the envelope detecting section; a loop filter section for filtering output signals of the subtracting section; and a voltage control oscillator for receiving output signals of the loop filter section to output oscillated signals as clock signals for the satellite code generating section. In another embodiment, said band filter section comprises 3 band filters, and said 3 band filters consist of Chevishev secondary active filters having ripples of 0.5 dB.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
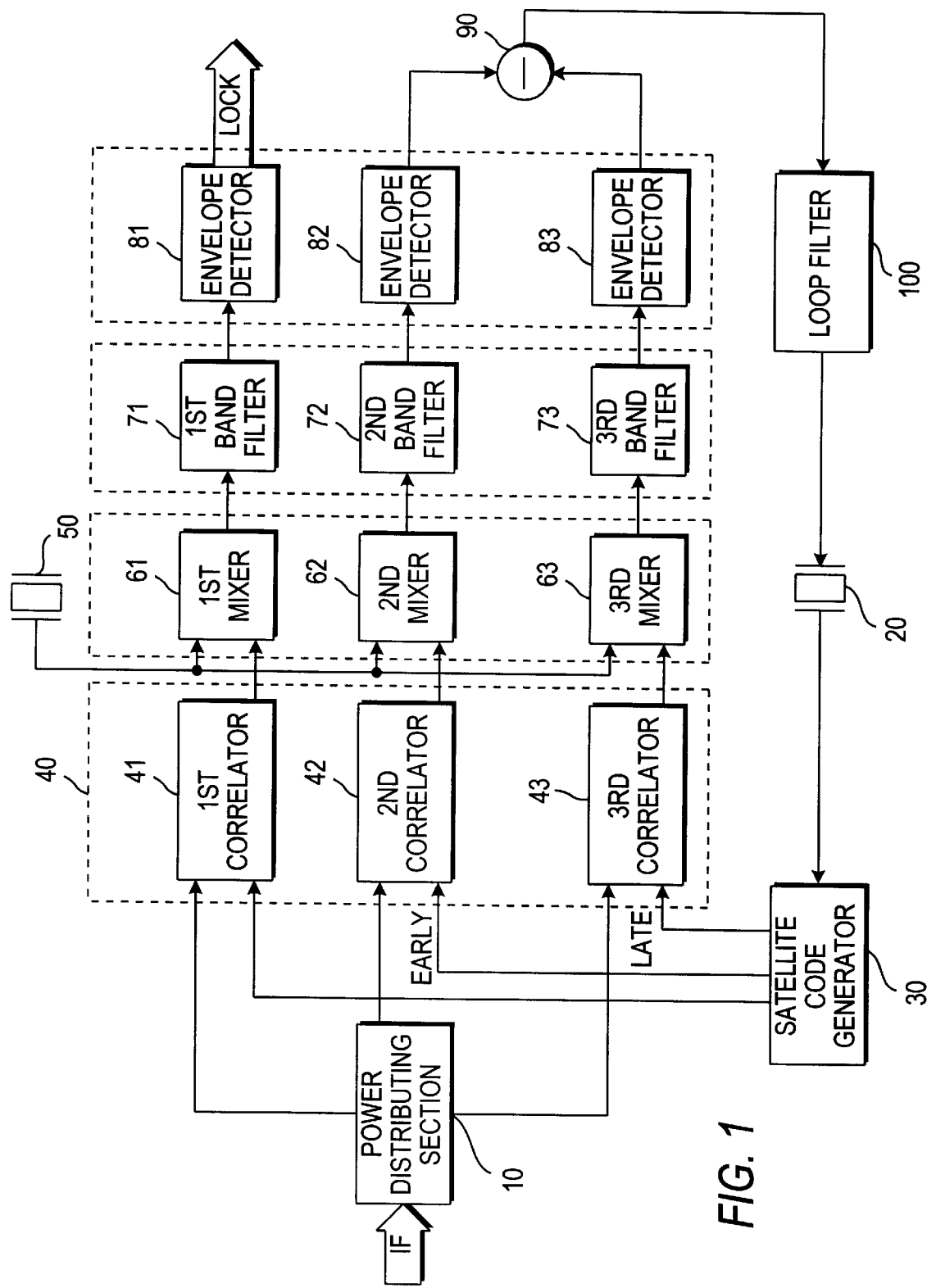
FIG. 1 is a block diagram showing the constitution of the GPS signal receiving apparatus using a non-coherent DLL according to the present invention.

FIG. 1 is a block diagram showing the constitution of the GPS signal receiving apparatus using a non-coherent DLL according to the present invention.

A power distributing section 10 receives intermediate frequency signals IF which have been converted to a low frequency after being received from a GPS satellite, so as to divide the power into 3 equal portions. A satellite code generating section 30 receives clock signals of a certain frequency from a voltage control oscillator 20 to generate a lagging code LATE (e.g., ½ bits), a leading code EARLY and a normal code MEDIUM.

A correlating section 40 includes a first correlator 41, a second correlator 42 and a third correlator 43.

The first correlator 41 takes and outputs a correlation between the 3-portion power distributed intermediate frequency signals of the power distributing section 10 and the normal code MEDIUM of the satellite code generating section 30.

The second correlator 42 takes and outputs a correlation between the 3-portion power distributed intermediate frequency signals of the power distributing section 10 and the leading code EARLY of the satellite code generating section 30.

The third correlator 43 takes and outputs a correlation between the 3-portion power distributed intermediate frequency signals of the power distributing section 10 and the lagging code LATE of the satellite code generating section 30.

A mixing section 60 includes a first mixer 61, a second mixer 62 and a third mixer 63, and the mixers 61, 62 and 63 mix together the output signals of the respective correlators 41, 42 and 43 and the locally oscillated signals of a local oscillator 50.

A band filter section 70 includes a first band filter 71, a second band filter 72 and a third band filter 73, and the band filters 71, 72 and 73 filter the output signals of the mixers 61, 62 and 63.

The envelope detecting section 80 includes a first envelope detector 81, a second envelope detector 82 and a third envelope detector 83, and the envelope detectors 81, 82 and 83 detect envelopes from the output signals of the band filters 71, 72 and 73.

A subtractor 90 outputs a difference between the signals of the second envelope detector 82 and the third envelope detector 83.

A loop filter section 100 receives the output signals of the subtractor 90 to output them to the voltage control oscillator 20. In the voltage control oscillator 20, the oscillating frequency is varied in accordance with an externally supplied voltage. The local oscillator 50 generates oscillating signals to supply them to the mixing section 60 so as to convert the frequency of the output signals of the correlating section 40.

The waves from a GPS satellite are received through an antenna (e.g., dipole antenna, helical antenna or the like). The waves which are received through an antenna are as weak as −130 dBm, and therefore, they are amplified by a radio wave amplifying section. Then they are down-converted by a frequency converting section so as to be outputted as an intermediate frequency IF (e.g., 10.7 MHz). The intermediate frequency IF has a mean frequency of 10.7 MHz, and its band width is spread to 2.048 MHz.

The intermediate frequency which is outputted from the frequency converting section is divided into 3 portions by the power distributing section 10. The divided portions are equally inputted into the first, second and third correlators 41, 42 and 43 of the correlating section 40.

The first correlator 41 receives a satellite code (C/A code) and an intermediate frequency from the satellite code generating section 30 and the power distributing section 10 to take the correlation.

The second correlator 42 takes a correlation between a leading (by ½ bits) phase satellite code and the intermediate frequency signals. The third correlator 43 takes the correlation between a lagging (by ½ bits) satellite code and the intermediate frequency signals.

Figure 2:
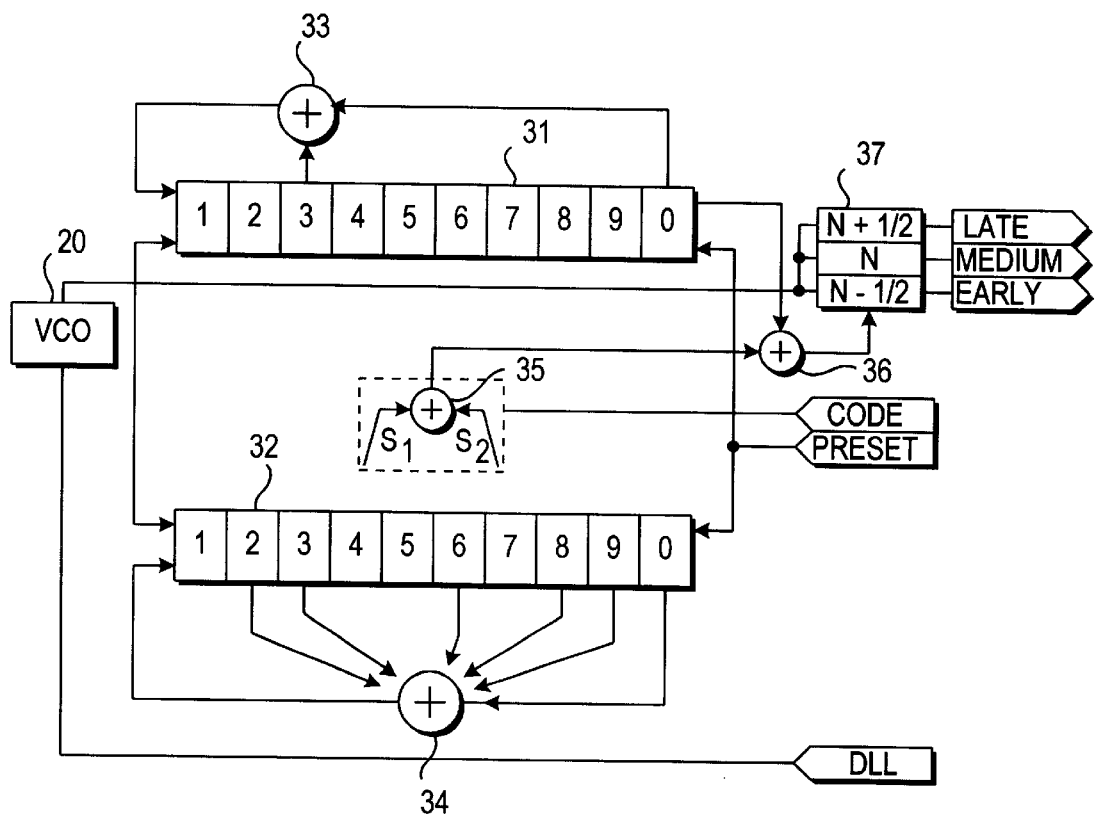
FIG. 2 is a circuital illustration of the satellite code generating section.

FIG. 2 is a circuital illustration of the satellite code generating section.

The satellite code generating section 30 includes: a pair of 10-stage shift registers 31 and 32; a first adder 33 for summing outputs of the intermediate stages (2nd stage to 9th stage) and the 10th stage of the first shift register 31 to input them into the first stage; a second adder 34 for summing a plurality of outputs from among the intermediate stages (2nd stage to 9th stage) and an output of the 10th stage of the second shift register 32 to input them into the first stage; a third adder 35 for summing outputs of two stages from among the intermediate stages (second stage to 9th stage); a fourth adder 36 for summing an output of the third adder 35 and an output of the first shift register 31; and a phase shifting section 37 for converting an output of the fourth adder 36 to a lagging code LATE (lagging e.g., by ½ bits), a leading code EARLY and a normal code MEDIUM in accordance with clocks of the voltage control oscillator 20.

The shift registers 31 and 32 are started by being set to 1 by time signals which are outputted from an atomic clock of the GPS satellite into a terminal. The C/A code which is generated in this manner has a bit speed of 1.023 Mbps, and a code length of 1023 bits. Thus a code having a period of 1 ms is inputted into the correlating section 40. That is, the lagging code LATE is inputted into the third correlator 43, the leading code EARLY is inputted into the second correlator 42, and the normal satellite code MEDIUM is inputted into the first correlator 41.

Currently, 27 GPS satellites are revolving around the earth, and all of them have different codes. Therefore, in order to find the code same as that of the immediately above, 2-stage outputs S1 and S2 are selected from among the intermediate stages (2nd to 9th stages) of the second shift register 32 arbitrarily or sequentially so as to input them into the third adder 35.

Figure 3:
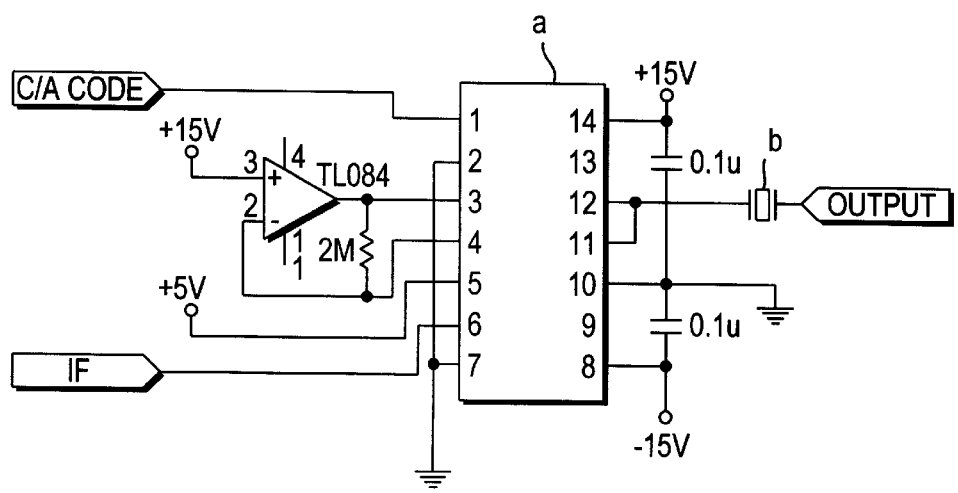
FIG. 3 is a circuital illustration of the correlator.

FIG. 3 is a circuital illustration of the correlator. As shown in this drawing, each of the correlators 41, 42 and 43 includes: a multiplier (a) for multiplying the C/A code of the satellite code generating section by an intermediate frequency of the power distributing section 10; and a band filter (b) for band-filtering output signals of the multiplier (a). Here, an OP amplifier is for input biasing.

Figure 6:
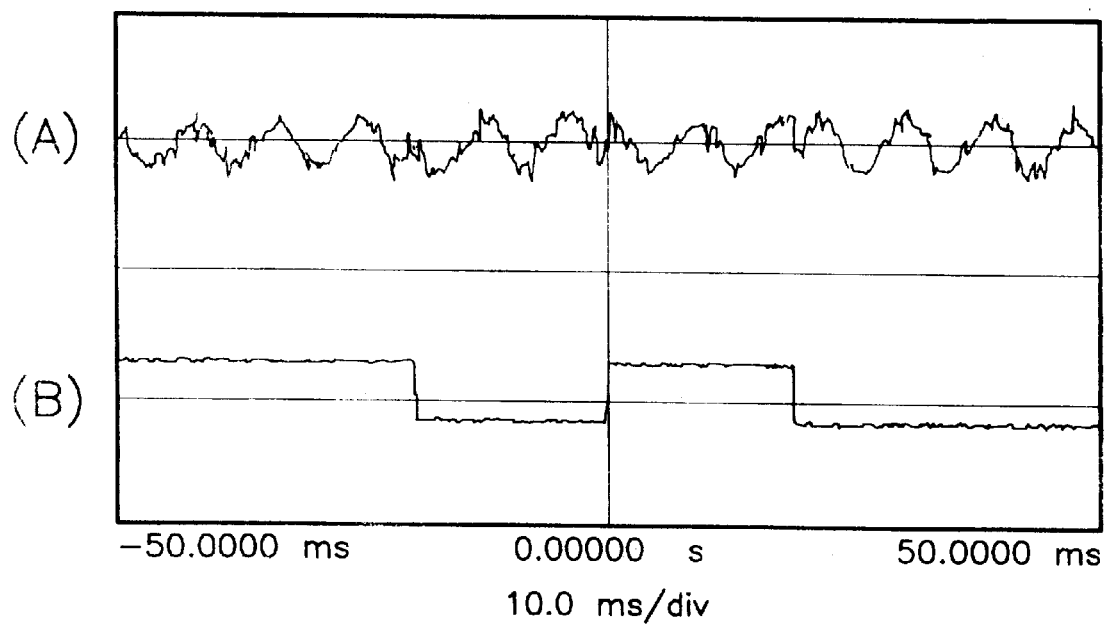
FIG. 6 illustrates the input data and the output data of the correlator during the correlation between the normal C/A code and an intermediate frequency.

In the first correlator 41 to the third correlator 43, the C/A code of the satellite code generating section is multiplied by an intermediate frequency of the power distributing section 10 by the multiplier. The output signals of the multiplier are filtered by the band pass filter. In the case where the C/A code of the satellite code generating section and the intermediate frequency of the power distributing section 10 correspond to each other, if the correlation between the signals of 10.7 MHz of the GPS satellite and the C/A code of the satellite code generating section 30 is taken, then the C/A code in the intermediate frequency signals which are received from the GPS satellite is decoded. FIG. 6 illustrates the input data and the signals which are outputted from the correlators when the normal C/A code MEDIUM and the intermediate signals are correlated.

Figure 7A:
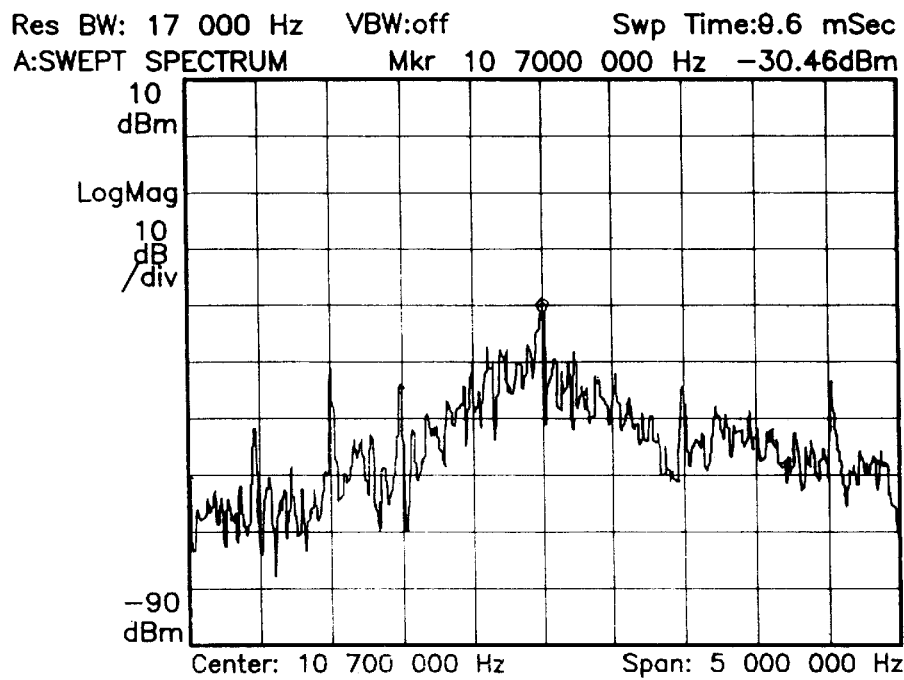
FIG. 7A illustrates the output spectrum of the correlator during a non-synchronization.
Figure 7B:
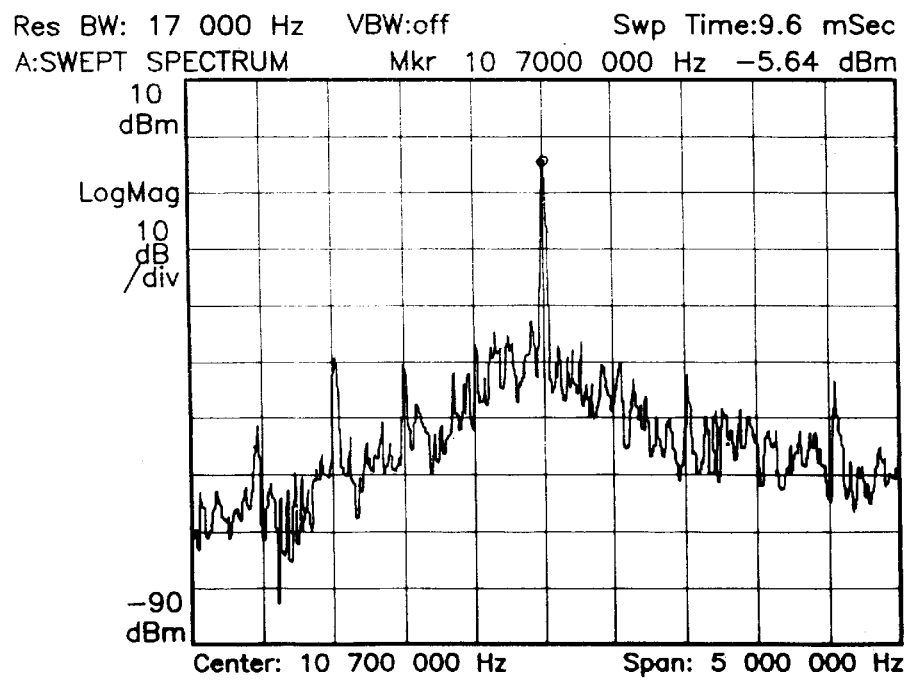
FIG. 7B illustrates the output spectrum of the correlator during a synchronization.

Therefore, the signals which are outputted from the first to third correlators 41–43 are those in which navigation messages of 50 bps are loaded on a carrier of 10.7 MHz, their band width being 3.75 KHz. Such signals are outputted from the correlating section 40 to be inputted into the mixing section 60. FIG. 7A illustrates the output spectrum of the correlator during a non-synchronization. FIG. 7B illustrates the output spectrum of the correlator during a synchronization.

The output signals of the first correlator 41 are inputted into the first mixer 61, and the output signals of the second correlator 42 are inputted into the second mixer 62, while the output signals of the third correlator 43 are inputted into the third mixer 63. The respective mixers 61, 62 and 63 mix together the locally oscillated signals of the local oscillator 50 and the relevant output signals of the respective correlators 41, 42 and 43. That is, the locally oscillated signals of 10.6 MHz of the local oscillator 50 are mixed with the output signals of 10.7 MHz of the correlating section 40 by the mixing section 60, with the result that difference signals of 100 KHz and addition signals of 21.3 MHz are outputted. The band filter section 70 extracts difference signals of 100 KHz from among the difference signals of 100 KHz and the addition signals of 21.3 MHz which are outputted from the mixing section 60.

Figure 4:
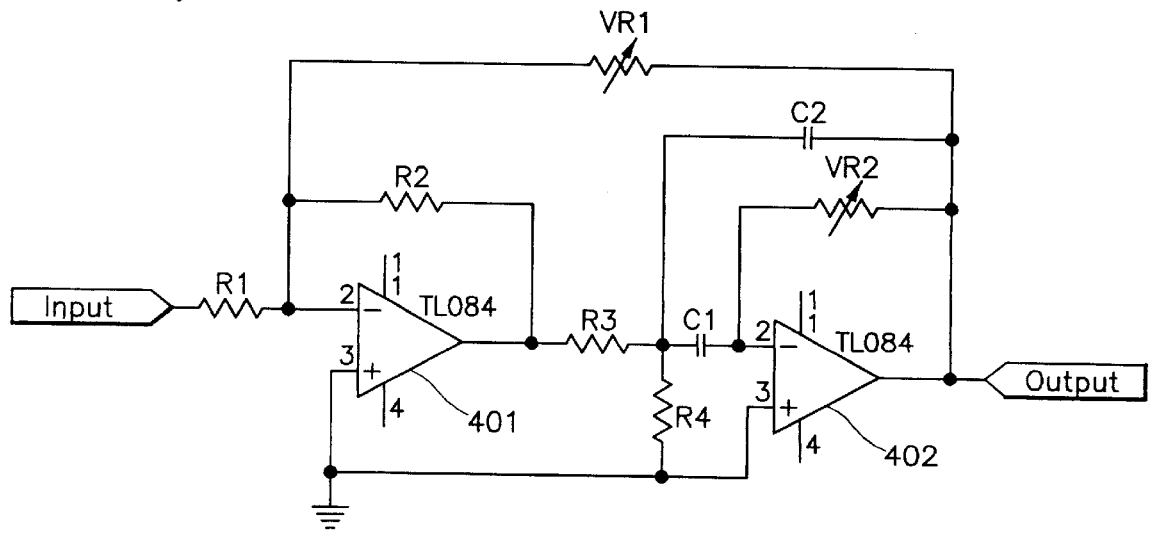
FIG. 4 is a circuital illustration of the band filter.

FIG. 4 is a circuital illustration of the band filter.

The band filters 71, 72 and 73 which constitute the band filter section 70 use the Chevishev secondary active filters. The output signals of the mixing section 60 are inputted through a resistor R1 into an inverting input terminal (-) of an arithmetic amplifier 401. The output signals of the arithmetic amplifier 401 are fedback through a resistor R2 into the inverting input terminal (-). Further, the output signals of the arithmetic amplifier 401 are inputted through a resistor R3 and a capacitor C1 into an inverting input terminal (-) of an arithmetic amplifier 402. Further, a resistor R4 is connected between the resistor R3 and the ground to form a bias. The output of the arithmetic amplifier 402 is fedback through a variable resistor VR2 and capacitors C2 and C1 into the inverting input terminal (-). At the same time, the output of the arithmetic amplifier 402 is fed back through a variable resistor VR1 into the inverting input terminal (-) of the arithmetic amplifier 401.

Figure 8:
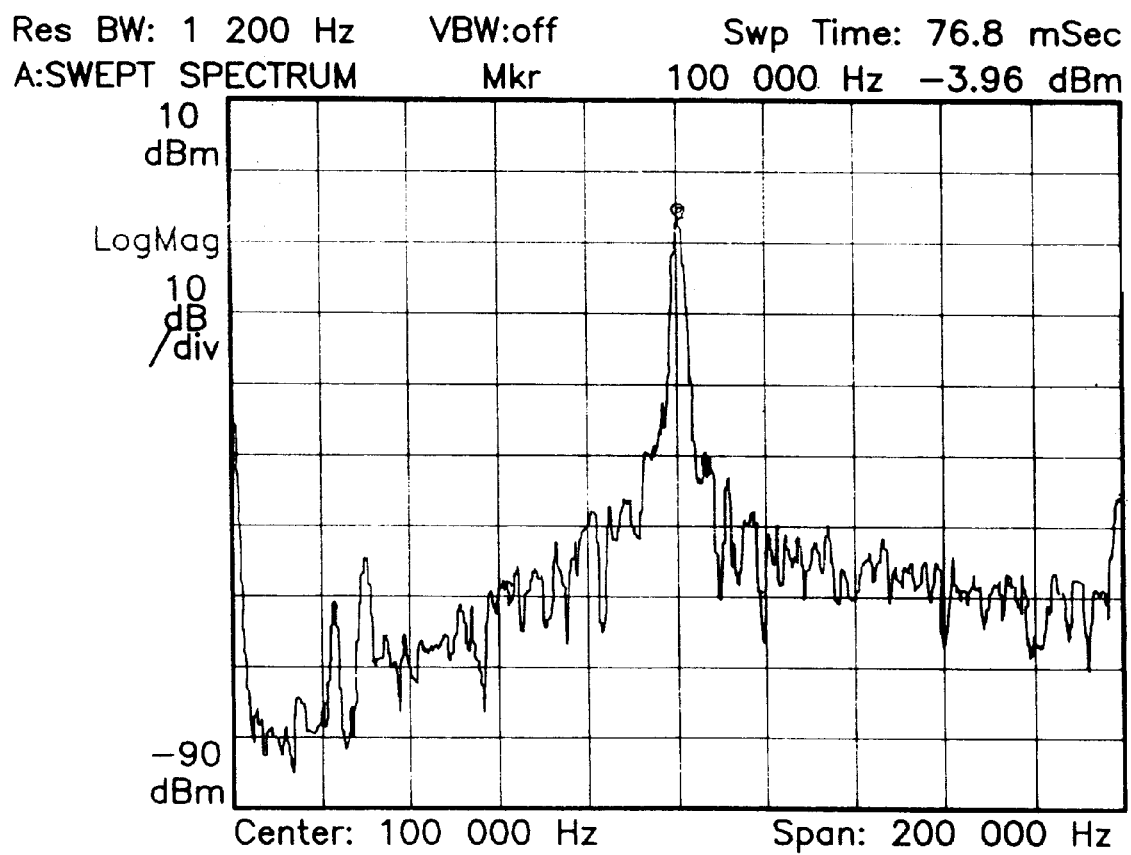
FIG. 8 illustrates the signals filtered by the band filter, with the medium frequency being 100 KHz, and the band width being ±1 KHz.

Difference signals between the locally oscillated 10.6 MHz signals of the mixing section 60 and the output signals of the correlating section are filtered by the band filters 71, 72 and 73 into signals having a frequency of 100 KHz and a band width of 1 KHz as shown in FIG. 8 before being outputted. The output signals of the band filter section 70 are BPSK signals which are formed by PSK-modulating the 100 KHz signals into the data of the GPS satellite. The signals which are outputted from the first filter 71 are subjected to a second demodulation so as to be used in detecting the GPS satellite data.

The signals which are outputted from the band filter section 70 are inputted into the envelope detecting section 80. The first to third envelope detectors 81–83 detect envelopes from the output signals of the first to third band filters 71–73. That is, the envelope detector includes a full wave rectifier and a flattener. The output signals of the band filter 70 are full-wave-rectified by the full wave rectifier, and are flattened by a flattener, before being outputted. If the code pattern of the GPS satellite corresponds to the code pattern of the satellite code pattern generating section 30, then the output signals of the first envelope detector 81 become a dc voltage of a certain level (2 V or over). This voltage is supplied as phase synchronization lock signals to an external system. Further, if the code pattern of the GPS satellite corresponds to the code pattern of the satellite code generating section, then the output signals of the second and third envelope detecting sections 82 and 83 have a mutual difference 0 V. Consequently, the difference voltage between the two signals of the subtractor 90 becomes 0 V, and therefore, the voltage which is outputted to the loop filter section 100 becomes 2.5 V.

Figure 5:
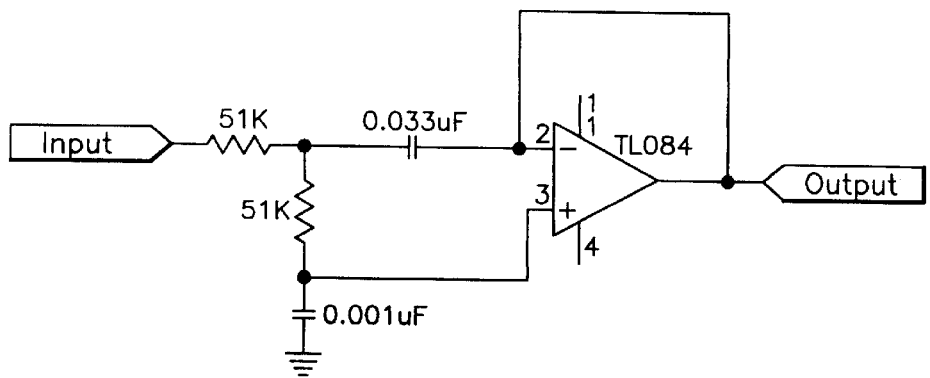
FIG. 5 is a circuital illustration of the loop filter section.

FIG. 5 is a circuital illustration of the loop filter section. The loop filter section 100 uses an active secondary filter to obtain a steep damping effect, and to remove the noise which is contained within the difference voltage of the output signals of the subtractor. The difference voltage with the noise removed is inputted into the voltage control oscillator 20 to control its oscillation frequency. The voltage control oscillator 20 outputs oscillation signals with a frequency of 1.023 MHz at a reference voltage of 2.5 V. Its voltage control range is 2–5 V, and its frequency control range is 1 KHz. That is, in the case where the loop filter section 100 outputs a voltage of 2.5 V, the output signals of the voltage control oscillator 20 have a frequency of 1.23 MHz. In the case where it outputs a voltage of 0 V, the output signals of the oscillator 20 has a frequency of 1.022 MHz, while in the case of 5 V, the output signals have a frequency of 1.024 MHz.

Even if the C/A code which is loaded in the intermediate frequency from the GPS satellite is not 1023 bps, the frequency of the oscillated output signals can be varied by varying the control voltage which is supplied to the voltage control oscillator 20. This varied oscillation signals can be supplied as clock signals for the satellite code generating section 30. Thus the generation speed of the C/A code can be matched with the C/A code which is loaded in the above mentioned intermediate frequency.

According to the present invention as described above, the C/A code is synchronized by utilizing the non-coherent DLL so as to remove the unique code of the GPS satellite. As a result, the apparatus becomes strong against noise, and the intermediate frequency signals can be easily processed.

What is claimed is:

1. A GPS signal receiving apparatus using a non-coherent DLL, comprising:

a satellite code generating means for receiving clock signals of a certain frequency to generate lagging, leading or normal satellite code;

a correlating means for taking a correlation between a lagging, leading or normal phase satellite code of said satellite code generating means and intermediate frequency signals which have been down-converted after received from a GPS satellite;

a mixing means for mixing together signals of different phases of said correlating means and signals of a local oscillator respectively;

a band filter means for filtering output signals of said mixing means into preset bands respectively;

an envelope detecting means for detecting envelopes from output signals of said band filter means;

a subtracting means for correlating the lagging and leading phase satellite codes with the intermediate frequency signals to output a difference between the two sets of signals of said mixing means and said band filter means and said envelope detecting means;

a loop filter means for filtering output signals of said subtracting means; and a voltage control oscillator for receiving output signals of said loop filter means to output oscillated signals as clock signals for said satellite code generating means.

2. The GPS signal receiving apparatus as claimed in claim 1, wherein said satellite code generating means comprises:

a pair of 10-stage shift registers;

a first adder for summing outputs of intermediate stages and a 10th stage of said first shift register to input them into a first stage;

a second adder for summing a plurality of outputs from among intermediate stages and an output of the 10th stage of said second shift register to input them into a first stage;

a third adder for summing outputs of two stages from among the intermediate stages of said second shift register;

a fourth adder for summing an output of said third adder and an output of said first shift register; and a phase shifting means for converting an output of said fourth adder into a lagging code, a leading code and a normal code in accordance with clocks of said voltage control oscillator.

3. The GPS signal receiving apparatus as claimed in claim 1, wherein said correlating means comprises: a multiplier for multiplying intermediate frequency signals of said power distributing means by the C/A code of said satellite code generating means; and a band filter for band-filtering output signals of said multiplier.

4. The GPS signal receiving apparatus as claimed in claim 1, wherein said band filter means comprises 3 band filters, wherein said 3 band filters consist of Chevishev secondary active filters having ripples of 0.5 dB.

5. The GPS signal receiving apparatus as claimed in claim 1, wherein said band filter means comprises: a first arithmetic amplifier for receiving output signals from said mixing means through a first resistor into an inverting input terminal, said first amplifier outputting a first output signal, said first amplifier receiving said first output signal through a second resistor into an inverting input terminal; a second arithmetic amplifier for receiving said first output signal through a third resistor and a first capacitor into an inverting input terminal, said second amplifier outputting a second output signal, said second amplifier receiving said second output signal through a second variable resistor and through said first capacitor and a second capacitor into an inverting input terminal; a fourth resistor connected between said third resistor and a ground to form a bias; and a first variable resistor for feeding back said second output signal into the inverting input terminal of said first arithmetic amplifier.

6. The GPS signal receiving apparatus as claimed in claim 1, wherein said envelope detecting means comprises: a full wave rectifier for full-wave-rectifying output signals of said band filter means; and a flattener for flattening output signals of said full wave rectifier.

7. The GPS signal receiving apparatus as claimed in claim 2, wherein said third adder sums outputs of two stages from among intermediate stages of said second sift register in an arbitrary or sequential manner.

8. A GPS signal receiving apparatus using a non-coherent DLL, comprising:

a power distributing means for receiving down-converted intermediate frequency signals (down-converted after reception from a GPS satellite) to divide them into 3 equal portions;

a satellite code generating means for receiving clock signals of a certain frequency to generate lagging, leading or normal satellite code;

a correlating means for taking a correlation between a lagging, leading or normal phase satellite code of said satellite code generating means and intermediate frequency signals which have been down-converted after being received from a GPS satellite;

a mixing means for mixing together signals of different phases of said correlating means and signals of a local oscillator respectively;

a band filter means for filtering output signals of said mixing means into preset bands respectively;

an envelope detecting means for detecting envelopes of output signals of said band filter means;

a subtracting means for correlating the lagging and leading phase satellite codes with the intermediate frequency signals to output a difference between the two sets of signals of said mixing means and said band filter means and said envelope detecting means;

a loop filter means for filtering output signals of said subtracting means; and a voltage control oscillator for receiving output signals of said loop filter means to output oscillated signals as clock signals for said satellite code generating means.

* * * * *

UNITED STATES PATENT AND TRADEMARK OFFICE
CERTIFICATE OF CORRECTION

PATENT NO. : 6,055,265
DATED : April 25, 2000
INVENTOR(S) : Hai Sik Kim

It is certified that error appears in the above-indentified patent and that said Letters Patent is hereby corrected as shown below:

Title page, item [75], inventor: change "Hae Sik Kim" to --Hai Sik Kim--

In claim 5, column 7, line 35, after "signal", delete the comma and insert a period therefor.

In claim 5, column 7, line 36, change the first occurrence of "said" to --Said--.

In claim 5, column 7, line 41, change "signal, said" to --signal. Said--.

Signed and Sealed this

Thirteenth Day of March, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,055,265
DATED : April 25, 2000
INVENTOR(S) : Hai Sik Kim

It is certified that error appears in the above-identified patent and that said Letters Patent is hereby corrected as shown below:

<u>Title page,</u>
Inventor section, change "Hae Sik Kim" to -- Hai Sik Kim --.

Signed and Sealed this

Eleventh Day of September, 2001

*Attest:*

NICHOLAS P. GODICI
*Attesting Officer*    *Acting Director of the United States Patent and Trademark Office*